April 30, 1935.  F. ANDERSON  1,999,314
METHOD OF CUTTING AND FORMING THE PARTS OF
TOYS AND OTHER ARTICLES FROM CARDBOARD
Filed Sept. 5, 1933  2 Sheets-Sheet 2
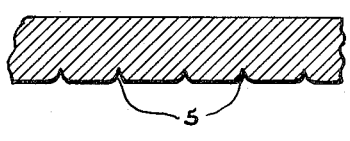
Fig. 2.
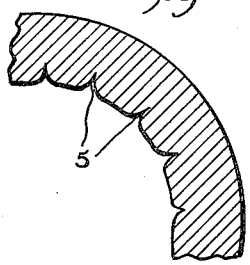
Fig. 3.
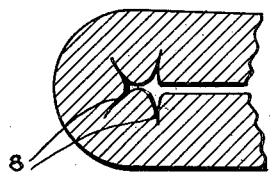
Fig. 4.
Fig. 5.
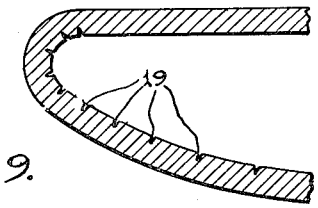
Fig. 6.
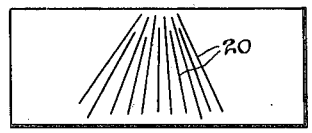
Fig. 7.
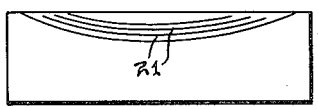
Fig. 9.
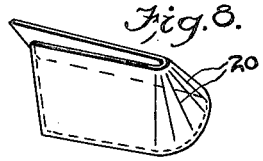
Fig. 8.
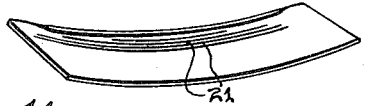
Fig. 10.
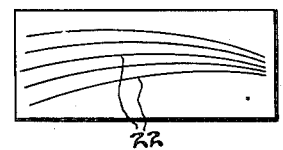
Fig. 11.
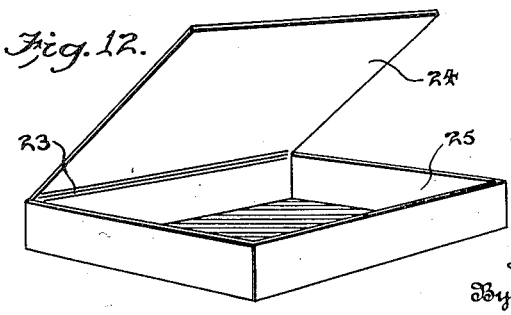
Fig. 12.
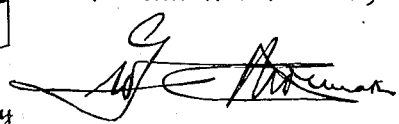
Inventor
Frohman Anderson,
By
Attorney Patented Apr. 30, 1935

1,999,314

UNITED STATES PATENT OFFICE 1,999,314

METHOD OF CUTTING AND FORMING THE PARTS OF TOYS AND OTHER ARTICLES FROM CARDBOARD

Frohman Anderson, Detroit, Mich.

Application September 5, 1933, Serial No. 688,225

18 Claims. (Cl. 93—84)

The invention relates to a method of cutting and forming the parts of toys and other articles from cardboard.

An object of the present invention is to provide a method of manufacture by which the advantage of cutting figures or elements and the formation of bending crease lines may be obtained by the use of ruled dies so that the figures of mechanical toys and the operating mechanism thereof involving intricate patterns may be easily and cheaply produced from cardboard.

A further object of the invention is to provide a method by which bending, folding and shaping operations subsequent to the cutting and crease line forming may be accomplished with accuracy and great facility and without the liability of rupturing and tearing the parts.

A further object of the invention is to provide a method of bending and shaping cardboard and analogous material by which the crease lines will be located interiorly of the article and concealed from view in the completed article and by which method continuous layers of cardboard will be arranged exteriorly of the toy or other article so as to present a smooth unbroken exterior surface and the article present a highly ornamental appearance without subjecting the uncut or unbroken outer layers of the material to excessive tensile strain.

It is also an object of the invention to provide a method of bending cardboard and analogous material so that all of the layers, both creased and uncreased, will be utilized and will result in a firm, strong structure containing all of the original material of the cardboard.

A further object of the invention is to provide a method of cutting and forming articles of cardboard by which the elements of the figure of a toy and the mechanical parts will be die cut, blanked out and the bending creases formed with a single operation.

Further objects and advantages of the method will appear from the following description and the accompanying drawings, in which—

Fig. 2 is an enlarged detail sectional view of a portion of the sheet of cardboard having crease lines formed therein.

Fig. 3 is a similar view illustrating the arrangement of the material at the crease line when the cardboard is bent into a curved shape.

Fig. 4 is an enlarged detail sectional view illustrating the arrangement of the layers of the creased cardboard when the cardboard is given a complete bend.

Figs. 5 and 6 are detail views showing creases arranged at different distances apart for forming compound curved surfaces.

Figs. 7 and 8 are detail views illustrating the arrangement of a group of straight divergent crease lines to produce a conical surface on bending.

Figs. 9 and 10 are detail views illustrating the arrangement of a group of parallel curved crease lines to produce a partial torus surface on bending.

Fig. 11 is a detail view illustrating a group of divergent curved crease lines to produce a decreasing radius of curvature on bending.

Fig. 12 is a detail perspective view of a box or container having a plurality of crease lines for forming a hinge for connecting the lid of the box or container to the body thereof.

Figure 1:
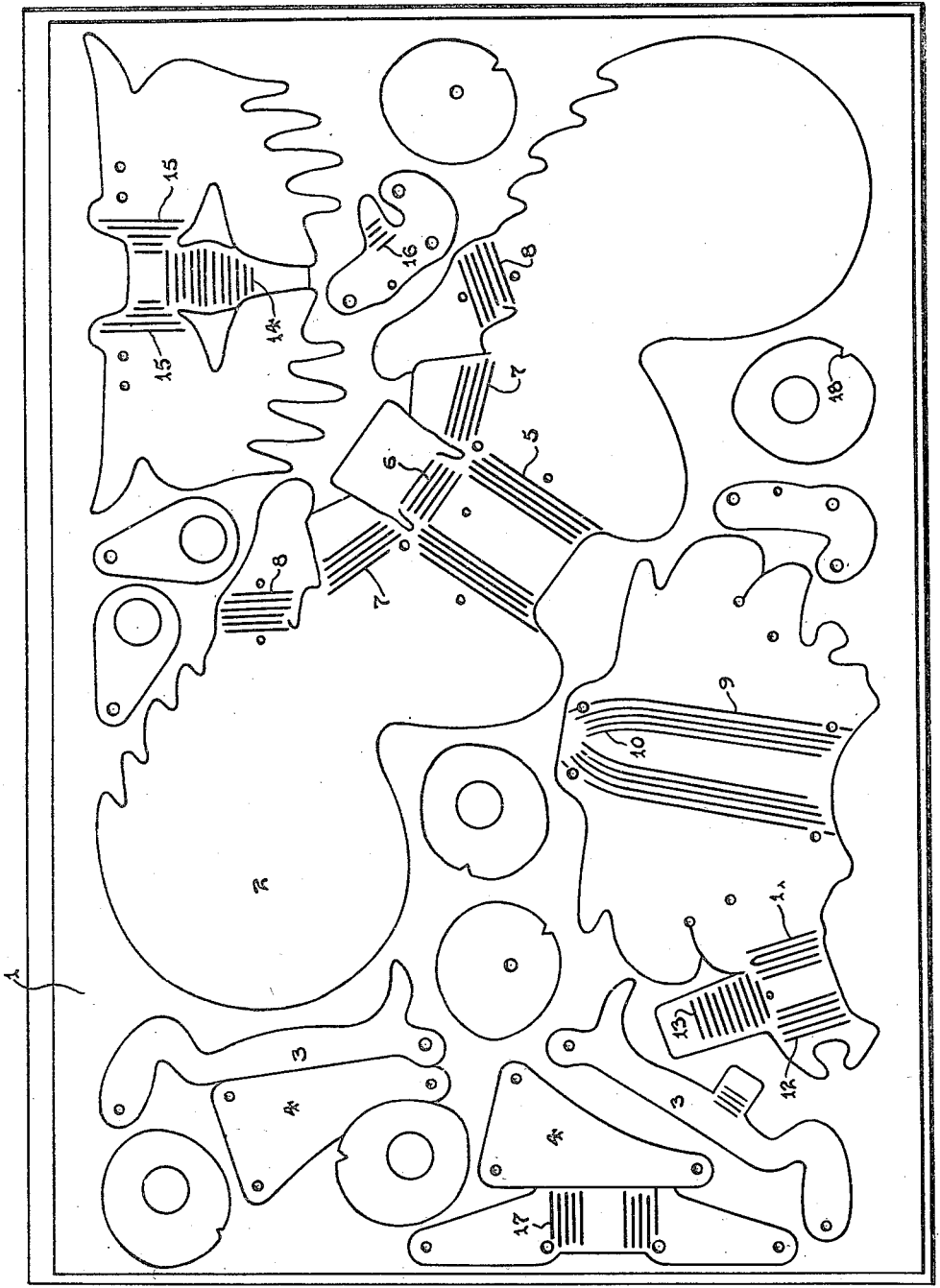
Figure 1 is a plan view of a sheet of cardboard die cut to form the principal portions of a toy rooster, the crease lines being formed to permit accurate bending of the parts or elements of the toy.

Referring particularly to Fig. 1 of the drawings, 1 designates a sheet of cardboard or fibre board cut to form figure elements 2 of a mechanical toy rooster. The mechanical parts 3 and the structural or bracing elements 4 are die cut out of the cardboard simultaneously with the figure elements of the toy by a single die cutting operation by the use of steel rule dies which will enable intricate patterns to be easily and cheaply cut from cardboard, fibre, asbestos, wall board and analogous fibrous sheet material, and it will be understood that in the description of the method of the present invention the term cardboard will comprehend any of such sheet materials.

The figure element which forms the body portion of the rooster is provided with groups 5, 6, 7 and 8 of parallel crease lines substantially uniformly spaced and adapted to produce relatively broad curved bends and the number of the crease lines and spacing of the same will determine the character of the curve produced by the bending of the cardboard. The crease lines which may be formed by crushing, cutting, scoring or partial perforation, are located at the inner face of the cardboard or interiorly of the bend so that the outer layers of the cardboard will be unbroken and the inner creased or scored layers will be compressed by the bending of the cardboard, as illustrated in Figs. 3 and 4 of the drawings. None of the material of the cardboard is discarded and all of the material of the cardboard is utilized in making the bend.

The creased layers which are compressed as shown in Figs. 3 and 4 by the bending automatically adjust themselves to their new position resulting from the bending and a firm, solid structure at the bend results which is far superior in strength, durability and length of life to material having bending scores or creases arranged exteriorly of the material. When the scored or creased material is bent and the creased or scored layers compressed, the continuous unbroken outer layer is subjected to tensile strain, but the strain is not sufficient to cause any rupture or other injury to the material which is not impaired, but on the other hand stiffened and supported by the present method of bending.

The depth, number and spacing of the crease lines will determine the shape of the material when bent and the figure element forming the neck of the rooster is provided with spaced parallel groups of score lines 9 having curved portions 10 at one end of the groups. The curved portions of the groups converge and produce a taper when the neck piece or element is bent. The groups 11, 12 and 13 of the neck piece are formed in an extension at one end of the neck piece and produce curved surfaces when the material is bent. The crease lines terminate short of the marginal edges of the pieces cut from the cardboard and they may vary in length to form tapering groups 14 and 15, as clearly shown in the figure piece which forms the head of the rooster. The groups of parallel crease lines 16 and 17 are formed in certain of the mechanical elements for producing curved bends of the desired radii or curvature and the circular or cam shaped pieces which are designed to be built up in the form of a laminated wheel are provided with registering notches 18 cut in the periphery of the pieces to enable them to be accurately assembled.

As illustrated in Figs. 5 and 6 of the drawings the crease lines 19 may be arranged in parallelism at different distances apart to produce compound curves or a plurality of merging curved surfaces having different radii and, as illustrated in Figs. 7 and 8 of the drawings, straight divergent crease lines 20 may be provided for producing a conical surface on bending the material. Partial torus surfaces may be produced on bending the material by providing a group of parallel curved creases 21, as illustrated in Figs. 9 and 10 of the drawings, and such surfaces may be varied by providing a group 22 of converging or diverging crease lines which results in an increasing or decreasing radius of curvature on bending. It will thus be seen that crease lines of various forms and arrangements may be employed for producing the desired exterior surface on the bending of the material and that such crease lines will cause the material to take different forms on bending. A group 23 of parallel crease lines may be advantageously employed for connecting the lid 24 with the body 25 of a box or container to form a hinge and a hinge of this formation may be employed in toys and various other articles where a hinge action is required. The crease lines in the form of the hinge 23 may extend entirely across the material which is compressed at the crease lines when the lid is in its closed position.

The present method of cutting articles or parts of articles from sheet material and simultaneously forming bending crease lines therein may be employed in the construction of furniture and various other articles and for bending and shaping building materials such as wall board, asbestos and the like.

By the present method the parts are blanked or die cut from a single sheet of material and in the manufacture of toys and other articles the face of the sheet which will be exposed exteriorly of the article may be ornamented prior to the die cutting as intricate patterns may be accurately cut and the bending creases may be formed in the inner face of the material without injuring the exterior ornamented surface. The cut pieces when bent to the required form may be secured or retained in such form by metal stitches.

What is claimed is:

1. The method of cutting and forming articles and parts of articles from sheet material, comprising die cutting in a single operation a single sheet of material to produce the desired pieces of different shapes and to simultaneously form on the inner face of the material groups of bending crease lines in places on some of the pieces without displacing any portion of or otherwise affecting the outer face of the material for causing the material on bending to take a definite shape.

2. The method of cutting and forming articles and parts of articles from sheet material, comprising cutting a piece of sheet material in the desired shape and forming a plurality of similar bending creases in the inner face of the cut piece without displacing any portion of or otherwise affecting the outer face of the cut piece and bending the cut piece inwardly in an arc tangentially to the adjacent surfaces to subject the inner creased portion of the material to compression and the exterior portion of the material to a tensile strain.

3. The method of cutting and forming articles and parts of articles from sheet material, comprising cutting a piece of sheet material to blank out the desired shape and simultaneously forming similar crease lines in one face of the piece of sheet material without displacing any portion of or otherwise affecting the other face of the cut piece and bending the material on the creased portion in an arc tangentially to the adjacent surfaces to effect a compression of the said creased portion.

4. The method of cutting and forming articles and parts of articles from sheet material comprising die cutting sheet material to the required shape and forming in one of the surfaces of the cut material a plurality of similar straight parallel crease lines without displacing any portion of or otherwise affecting the other surface of the cut material and bending the material on the crease lines in an arc tangentially to the adjacent surfaces to effect a compression of the creased portion of the material.

5. The method of cutting and forming articles and parts of articles from sheet material comprising die cutting sheet material to the required shape and forming in one of the surfaces of the cut material similar parallel crease lines spaced at different distances apart without displacing any portion of or otherwise affecting the other surface of the cut material, and bending the material in an arc tangentially to the adjacent surfaces to compress the material at the crease lines.

6. The method of cutting and forming articles and parts of articles from sheet material comprising die cutting a piece of sheet material to the required shape and forming a plurality of curved crease lines in one of the surfaces of the cut material without displacing any portion of or otherwise affecting the other surface of the material and bending the material in an arc tangentially to the adjacent surfaces to compress the material at the crease lines.

7. The method of cutting and forming articles and parts of articles from sheet material comprising die cutting a piece of sheet material to the required shape and forming on one of the surfaces of the cut material a plurality of similar parallel crease lines having straight and curved portions without displacing any portion of or otherwise affecting the other surface of the cut material and bending the cut material in an arc tangentially to the adjacent surfaces to compress the material at the crease lines.

8. The method of cutting and forming articles and parts of articles from sheet material comprising die cutting a piece of sheet material to the required shape and forming in one of the surfaces of the cut material a plurality of straight crease lines diverging from substantially a single point without displacing any portion of or otherwise affecting the other surface of the cut material and bending the material in an arc to compress the same at the crease portions to form a conical exterior and at the same time maintaining the outer face of the material in its initial smooth, unbroken condition and with the initial dimensions thereof unchanged.

9. The method of cutting and forming articles and parts of articles from sheet material comprising die cutting a piece of sheet material to the required shape and forming in one of the surfaces of the cut material a group of similar curved crease lines arranged in parallel spaced relation without displacing any portion of or otherwise affecting the other surface of the cut material, and bending the cut material in an arc to compress the same at the crease line to form a substantially partial torus surface and at the same time maintaining the outer face of the material in its initial smooth, unbroken condition and with the initial dimensions thereof unchanged.

10. The method of cutting and forming articles and parts of articles from sheet material comprising die cutting a piece of sheet material to the required shape and forming in one of the surfaces of the cut material a group of curved crease lines diverging from one end of the group without displacing any portion of or otherwise affecting the other surface of the cut piece, and bending the material in an arc tangentially to the adjacent surfaces to compress the same at the crease lines and at the same time maintaining the outer face of the material in its initial smooth, unbroken condition and with the initial dimensions thereof unchanged.

11. The method of cutting and forming articles and parts of articles from sheet material comprising die cutting a piece of sheet material to the required shape and forming in one of the surfaces of the material a plurality of similar parallel crease lines extending substantially across the material without displacing any portion of or otherwise affecting the other surface of the material and bending the material in an arc tangentially to the adjacent surfaces to compress the same at the crease lines and to form a hinge joint and at the same time maintaining the outer face of the material in its initial smooth, unbroken condition and with the initial dimensions thereof unchanged.

12. The method of cutting and forming articles and parts of articles from sheet material including the step of simultaneously cutting from a single sheet of material a plurality of substantially circular pieces and forming definite peripheral registering portions to enable the pieces to be accurately assembled to provide a laminated wheel structure without interfering with the smooth rolling of the tread of the wheel structure on a supporting surface.

13. The method of cutting and forming articles and parts of articles from sheet material comprising die cutting a piece of sheet material to the required shape and forming in one of the surfaces of the cut material a plurality of straight crease lines arranged at an angle to each other without displacing any portion of or otherwise affecting the other surface of the cut material, and bending the material at the crease lines in an arc tangential to the adjacent surfaces to compress the material at the said crease lines.

14. The method of cutting and forming articles and parts of articles from sheet material comprising die cutting a piece of sheet material to the required shape and forming in one of the surfaces of the cut material a plurality of curved crease lines arranged at an angle to each other without displacing any portion of or otherwise affecting the other surface of the cut material, and bending the material at the crease lines in an arc tangential to the adjacent surfaces to compress the material at the said crease lines.

15. The method of cutting and forming articles and parts of articles from sheet material comprising cutting a piece of sheet material to the required shape and forming in one of the surfaces of the material a plurality of similar crease lines at the inner face of the material without displacing any portion of or otherwise affecting the other face of the material and bending the material at the crease lines in an arc tangential to the adjacent surfaces to form a hinge.

16. The herein described method of forming articles from sheet material including the step of forming a group of curved crease lines at the inner surface of the sheet material without displacing any portion of or otherwise affecting the outer surface of the sheet material and bending the sheet material at the crease lines in an arc to form a curved surface.

17. The method of cutting and forming articles and parts of articles from sheet material including the steps of forming in the inner surface of the material a group of straight crease lines arranged at an angle to each other without displacing any portion of or otherwise affecting the outer surface of the material and bending the material at the crease lines in an arc substantially tangential to the adjacent surfaces.

18. The method of forming articles and parts of articles from sheet material including the steps of forming in the inner surface of the material a group of crease lines without displacing any portion of or otherwise affecting the outer surface of the material and bending the material at the crease line in an arc to produce a compression of the inner creased portion of the material and subject the exterior portion of the material to a tensile strain.

FROHMAN ANDERSON.